(12) United States Patent
Nakayama et al.

(10) Patent No.: US 8,535,106 B2
(45) Date of Patent: Sep. 17, 2013

(54) RETAINING STRUCTURE FOR HONEYCOMB STRUCTURE AND MARINE PROPULSION DEVICE

(75) Inventors: Koichi Nakayama, Shizuoka (JP); Toshio Suzuki, Shizuoka (JP); Katsumi Ochiai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 174 days.

(21) Appl. No.: 13/268,014

(22) Filed: Oct. 7, 2011

(65) Prior Publication Data

US 2012/0196495 A1    Aug. 2, 2012

(30) Foreign Application Priority Data

Feb. 2, 2011   (JP) ................................. 2011-021074

(51) Int. Cl.
*B63H 21/32* (2006.01)
*F01N 3/04* (2006.01)

(52) U.S. Cl.
USPC ..................................... 440/89 B; 440/89 H

(58) Field of Classification Search
USPC .............................................. 440/89 B, 89 H
See application file for complete search history.

(56) References Cited

U.S. PATENT DOCUMENTS

| 4,407,785 | A | * | 10/1983 | Pfefferle | 423/659 |
| 4,448,833 | A | * | 5/1984 | Yamaguchi et al. | 428/116 |
| 4,457,141 | A | * | 7/1984 | Yoshioka | 62/299 |
| 4,756,943 | A | * | 7/1988 | Koletzko | 428/116 |
| 4,849,274 | A | * | 7/1989 | Cornelison | 428/116 |
| 4,882,129 | A | * | 11/1989 | Andrews et al. | 422/186.2 |
| 5,194,414 | A | * | 3/1993 | Kuma | 502/80 |
| 2002/0189097 | A1 | * | 12/2002 | Collins et al. | 29/890 |
| 2009/0291828 | A1 | * | 11/2009 | Ohno et al. | 502/64 |

FOREIGN PATENT DOCUMENTS

| JP | 10-317947 A | 12/1998 |
| JP | 2007-100608 A | 4/2007 |

* cited by examiner

*Primary Examiner* — Stephen Avila
(74) *Attorney, Agent, or Firm* — Keating & Bennett, LLP

(57) ABSTRACT

A retaining structure for a honeycomb structure includes a honeycomb structure, a retainer mat, and a housing. The honeycomb structure is a member made of a ceramic material. The retainer mat is in contact with the honeycomb structure and directly retains the honeycomb structure. The housing is in contact with the retainer mat and directly retains the retainer mat. The housing is made of aluminum. The housing includes an inner wall, an outer wall, and a coolant passage. The inner wall is in contact with the retainer mat. The coolant passage is located between the inner wall and the outer wall. An inflow port of the coolant passage is located at one end of the housing. A discharge port of the coolant passage is located at the other end of the housing.

7 Claims, 7 Drawing Sheets

RETAINING STRUCTURE FOR HONEYCOMB STRUCTURE AND MARINE PROPULSION DEVICE

BACKGROUND OF THE INVENTION

1. Field of the Invention

The present invention relates to a retaining structure for a honeycomb structure, and to a marine propulsion device.

2. Description of the Related Art

Installation of a honeycomb structure in the exhaust device of an engine is known in the prior art. For example, a catalytic converter disclosed in Japanese Laid-open Patent Application No. 2007-100608 has a catalyst support, a retainer mat, and a housing. The catalyst support is composed of a honeycomb structure. The housing is formed of a thin sheet material, and directly retains the honeycomb structure which is wrapped in the retainer mat. The housing is welded to an exhaust manifold, and constitutes an exhaust passage.

Because the honeycomb structure is disposed midway along the exhaust passage, it is exposed to high-temperature exhaust gas. Consequently, the housing which retains the honeycomb structure reaches a high temperature as a result of being directly affected by heat emanating from the honeycomb structure. A housing designed to directly retain the honeycomb structure as with the catalytic converter of Japanese Laid-open Patent Application No. 2007-100608 is typically formed of a heat-resistant material such as stainless steel or the like, in order to avoid erosion at high temperatures.

According to an exhaust device disclosed in Japanese Laid-open Patent Application No. 10-317947, a coolant passage is disposed at the outer perimeter of the housing. However, in this exhaust device, a portion of the housing is not covered by the coolant passage. Consequently, with the housing of Japanese Laid-open Patent Application No. 10-317947, as with the housing of Japanese Laid-open Patent Application No. 2007-100608, it has been considered that the component may be formed from a heat-resistant material such as stainless steel or the like.

However, because stainless steel is heavy, stainless steel housings are not appropriate for engines that are required to be lighter in weight. Also, because the housing itself becomes extremely hot, there is a possibility of surrounding constituent components being thermally affected thereby.

For example, in an outboard motor, a lighter weight of the engine is required due to the fact that the weight of the engine significantly affects the performance of the boat. Also, in outboard motors and personal watercraft (PWC), the exhaust system constituent components, electrical components, and so on are laid out within a limited space inside a watertight engine case. Because of this, if the honeycomb structure is disposed close to the engine, there is a possibility of heat from the housing containing the honeycomb structure adversely affecting the other constituent components.

SUMMARY OF THE INVENTION

Preferred embodiments of the present invention provide a retaining structure for a honeycomb structure and a marine propulsion device which are lightweight and adapted to minimize thermal effects on surrounding components.

A retaining structure for a honeycomb structure according to a preferred embodiment of the present invention includes a honeycomb structure, a retainer mat, and a housing. The honeycomb structure is a member preferably made of a ceramic material. The retainer mat is in contact with the honeycomb structure and directly retains the honeycomb structure. The housing is in contact with the retainer mat and directly retains the retainer mat. The housing is preferably made of aluminum. The housing has an inner wall, an outer wall, and a coolant passage. The inner wall is in contact with the retainer mat. The coolant passage is located between the inner wall and the outer wall. An inflow port of the coolant passage is located at one end of the housing. A discharge port of the coolant passage is located at the other end of the housing.

A marine propulsion device according to another preferred embodiment of the present invention includes an engine, and a retaining structure for a honeycomb structure. The retaining structure for a honeycomb structure includes a honeycomb structure, a retainer mat, and a housing. The honeycomb structure is a member made of a ceramic material. The retainer mat is in contact with the honeycomb structure and directly retains the honeycomb structure. The housing is in contact with the retainer mat and directly retains the retainer mat. The housing is preferably made of aluminum. The housing constitutes portion of an exhaust passage through which flow exhaust gas expelled from the engine. The housing includes an inner wall, an outer wall, and a coolant passage. The inner wall contacts the retainer mat. The coolant passage is located between the inner wall and the outer wall. An inflow port of the coolant passage is provided at one end of the housing. A discharge port of the coolant passage is provided at another end of the housing.

In a retaining structure for a honeycomb structure according to a preferred embodiment of the present invention, having the honeycomb structure made of a ceramic material enables weight to be reduced to a greater extent than with a component made of metal such as stainless steel. Moreover, the housing directly retains the retainer mat and the honeycomb structure. Because of this, further reduction in weight is possible than with the case where the housing retains the retainer mat and the honeycomb structure via an additional member. Moreover, because the housing is made of aluminum and stainless steel is not used, weight can be reduced even further. Moreover, the coolant passage is arranged to extend from one end of the housing to the other. Because of this, erosion of the housing can be prevented. Moreover, thermal effects on components surrounding the retaining structure for the honeycomb structure can be minimized.

In a marine propulsion device according to another preferred embodiment of the present invention, because the honeycomb structure is made of a ceramic material, weight can be reduced to a greater extent than with a component made of metal such as stainless steel. Moreover, the housing directly retains the retainer mat and the honeycomb structure. Because of this, the weight can be reduced to a greater extent than with the case where the housing retains the retainer mat and the honeycomb structure via an additional member. Moreover, because the housing is made of aluminum and stainless steel is not used, weight can be reduced even further. Moreover, the coolant passage is arranged to extend from one end of the housing to the other. Because of this, erosion of the housing can be prevented. Moreover, thermal effects on components surrounding the retaining structure for the honeycomb structure can be minimized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
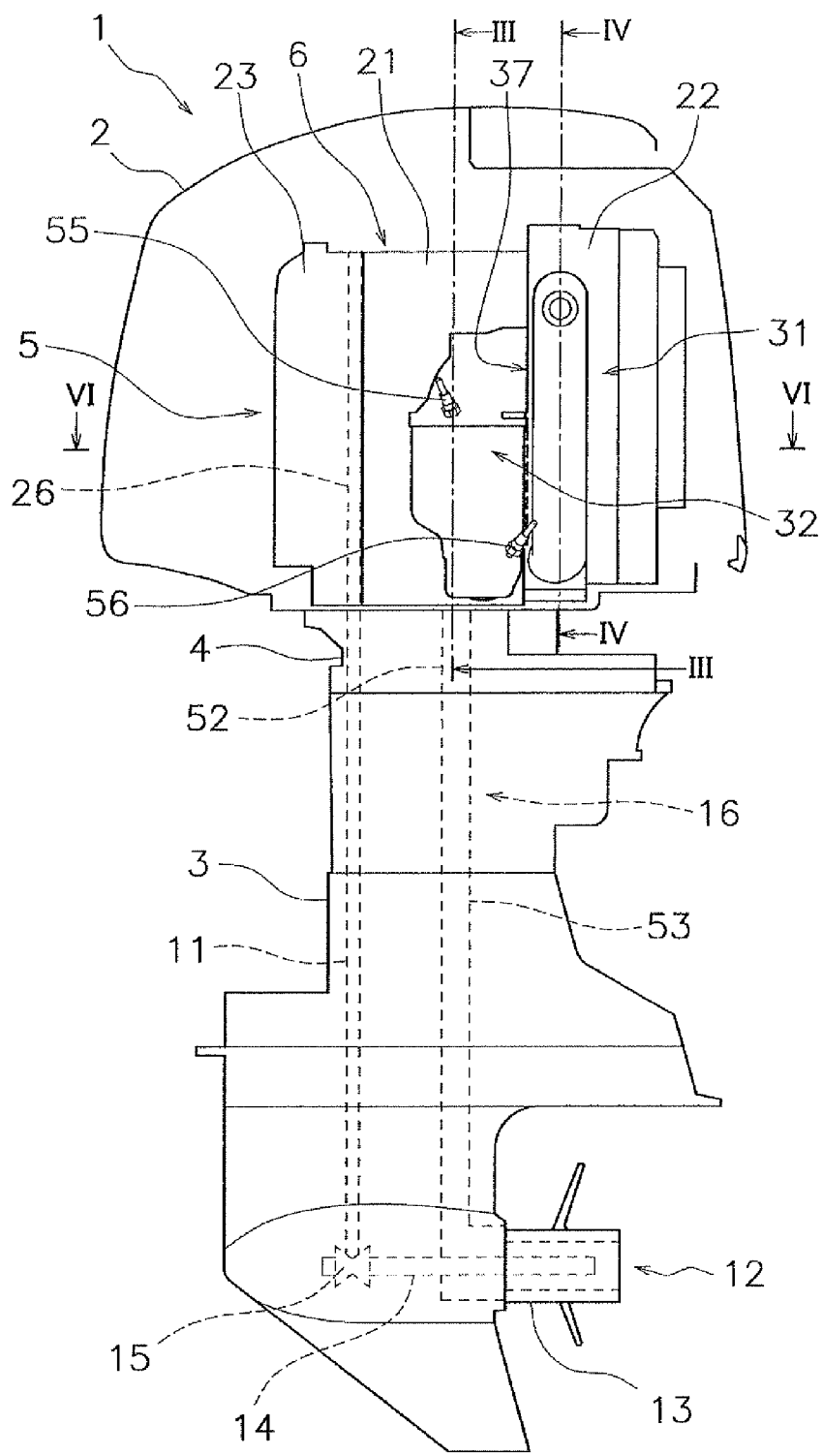
FIG. 1 is a side view of an outboard motor according to a preferred embodiment of the present invention.
Figure 2:
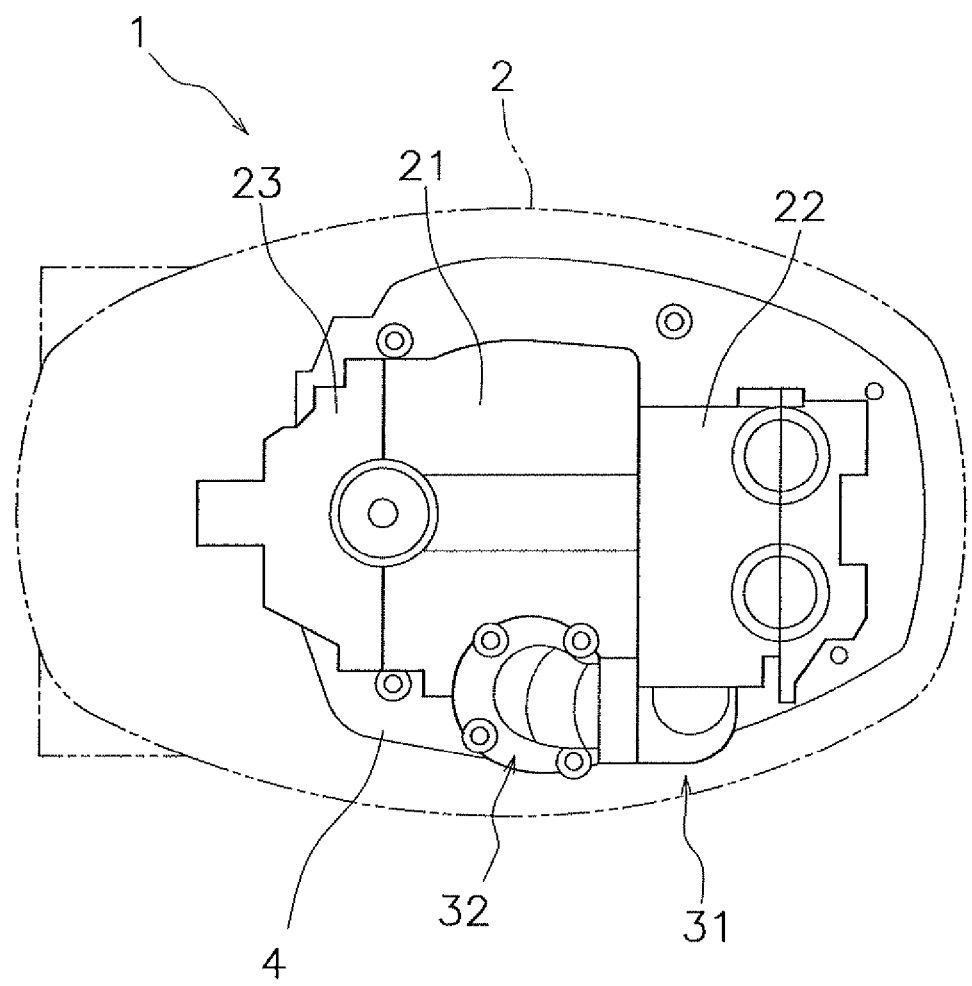
FIG. 2 is a top view of the outboard motor shown in FIG. 1.

FIG. 1 is a side view depicting an outboard motor 1 according to a preferred embodiment of the present invention. FIG. 2 is a top view of the outboard motor 1. As shown in FIGS. 1 and 2, the outboard motor 1 according to the present preferred embodiment includes an upper casing 2, a lower casing 3, an exhaust guide portion 4, and an engine unit 5. For ease of understanding, the upper casing 2 is shown in cross section in FIG. 1. In FIG. 2, the outer contours of the upper casing 2 are shown by double-dot and dash lines. The upper casing 2, the lower casing 3, and the engine unit 5 are fixed to the exhaust guide portion 4.

The engine unit 5 is disposed inside the upper casing 2. The engine unit 5 includes an engine 6, an exhaust manifold 31, and a catalytic converter 32. A drive shaft 11 is disposed inside the lower casing 3. The drive shaft 11 is disposed along the vertical direction inside the lower casing 3. The drive shaft 11 is fixed to a crankshaft 26 of the engine 6. A propeller 12 is disposed inside the lower portion of the lower casing 3. The propeller 12 is disposed below the engine 6. The propeller 12 includes a propeller boss 13. A propeller shaft 14 is disposed inside the propeller boss 13. The propeller shaft 14 is disposed along a longitudinal direction. The propeller shaft 14 is connected to the lower portion of the drive shaft 11 via a bevel gear 15.

In the outboard motor 1, the drive force generated by the engine 6 is transmitted to the propeller 12 via the drive shaft 11 and the propeller shaft 14. The propeller 12 is thereby rotated forward or rotated in reverse. As a result, a propulsion force will be generated to cause the vessel equipped with the outboard motor 1 to move forward or backward.

Figure 3:
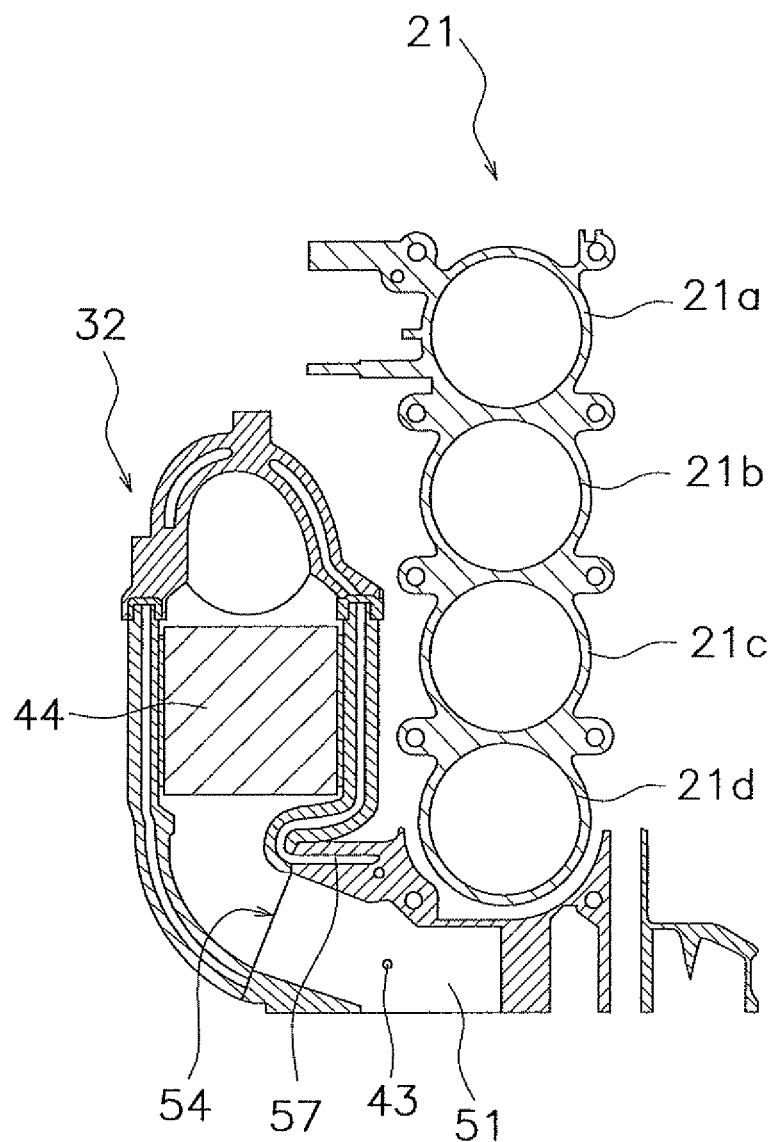
FIG. 3 is a sectional view along line III-III in FIG. 1.

The engine 6 includes a cylinder block 21, a cylinder head 22, and a crankcase 23. The cylinder block 21 is disposed above the exhaust guide portion 4 and is fixed to the exhaust guide portion 4. FIG. 3 is a sectional view of the outboard motor 1 along line III-III in FIG. 1. As shown in FIG. 3, the rear portion of the cylinder block 21 preferably includes four cylinders 21a to 21d, for example. The four cylinders 21a to 21d are disposed in-line in a vertical direction.

Figure 4:
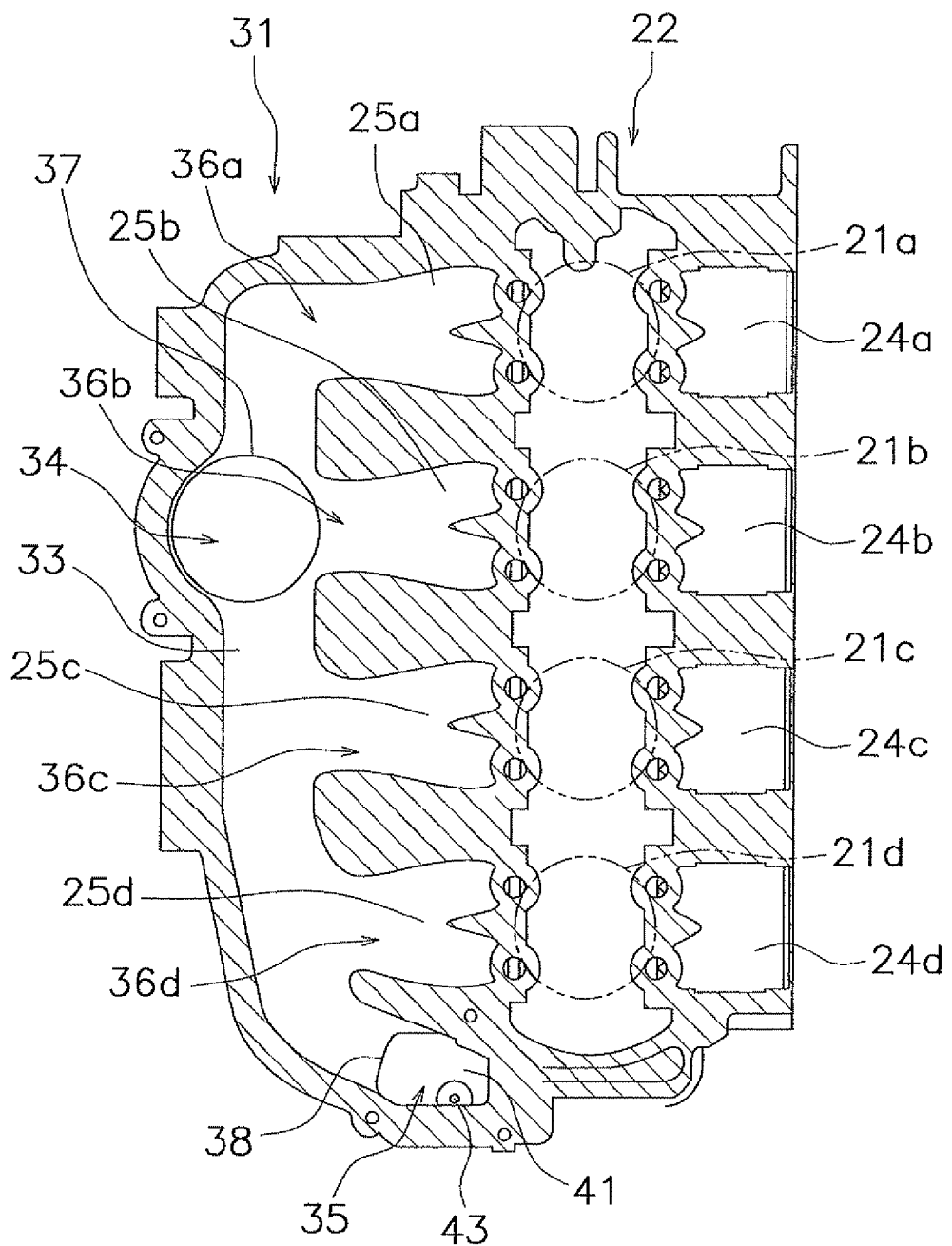
FIG. 4 is a sectional view along line IV-IV in FIG. 1.

The cylinder head 22 is disposed rearward of the cylinder block 21. FIG. 4 is a sectional view of the outboard motor 1 along line IV-IV in FIG. 1. As shown in FIG. 4, intake ports 24a to 24d and exhaust ports 25a to 25d are located inside the cylinder head 22. The intake ports 24a to 24d and the exhaust ports 25a to 25d are respectively connected to the cylinders 21a to 21d. The intake ports 24a to 24d are connected to a fuel supply device (not shown). The exhaust ports 25a to 25d extend in a lateral direction and are connected to a first passage 33 of the exhaust manifold 31, discussed below.

The crankcase 23 is disposed forward of the cylinder block 21. The crankshaft 26 is disposed inside the crankcase 23. The crankshaft 26 extends in a vertical direction. The top end portion of the driveshaft 11 is linked to the bottom end portion of the crankshaft 26. The movement of pistons (not shown) disposed inside the cylinders 21a to 21d is transmitted to the driveshaft 11 via the crankshaft 26.

The exhaust manifold 31 is disposed to the side of the cylinder head 22, and is integral with the cylinder head 22. As shown in FIG. 4, the exhaust manifold 31 includes a first passage 33, a second passage 34, and a third passage 35. The first passage 33 is connected to the plurality of exhaust ports 25a to 25d. The first passage 33 is disposed to the side of the cylinder head 22 and extends in a vertical direction. The first passage 33 collects the exhaust gas expelled from the exhaust ports 25a to 25d. The second passage 34 is connected to the first passage 33. The portion connecting the second passage 34 and the first passage 33 is positioned between the top end of the cylinder 21a positioned at the uppermost of the plurality of cylinders 21a to 21d, and the bottom end of the cylinder 21d positioned at the lowermost of the plurality of cylinders 21a to 21d. The second passage 34 extends in a longitudinal direction from the first passage 33. The second passage 34 includes a second opening 37. The catalytic converter 32, described below, is connected to the second opening 37. The third passage 35 is connected to the bottom end portion of the first passage 33. The third passage 35 extends in a longitudinal direction. The third passage 35 is positioned below the cylinder 21d which is positioned lowermost among the four cylinders 21a to 21d. The third passage 35 includes a third opening 38.

An obstructing portion 41 obstructs the way between a first lower passage 51 (see FIG. 3), described below, and the third passage 35. The obstructing portion 41 is a wall portion included in the cylinder block 21. The end portion of the third passage 35 joins with the obstructing portion 41, whereby the third opening 38 is obstructed by the obstructing portion 41. However, a communicating passage 43 is provided in the obstructing portion 41. The communicating passage 43 passes through the obstructing portion 41 and communicates with the first lower passage 51. The communicating passage 43 has a cross-sectional area smaller than the cross-sectional area of the third passage 35. The communicating passage 43 also has a cross-sectional area smaller than the second opening 37. Because of this, exhaust gas expelled from the third opening 38 is negligible, as compared with the second opening 37. Condensed water generated inside the first passage 33 flows into the first lower passage 51 shown in FIG. 3 via the communicating passage 43. In this way, the communicating passage 43 functions as a condensed water removal passage whereby condensed water generated inside the first passage 33 is removed from the first passage 33.

The catalytic converter 32 preferably is separate member from the cylinder head 22 and the cylinder block 21 and preferably separate from the exhaust manifold 31. The catalytic converter 32 is attached to the exhaust manifold 31 and the cylinder block 21. Specifically, one end of the catalytic converter 32 is connected to the second passage 34 of the exhaust manifold 31. The other end of the catalytic converter 32 is connected to a first lower opening 54 of the cylinder block 21, described below. The catalytic converter 32 extends downward from the second passage 34. Consequently, the catalytic converter 32 is disposed approximately parallel to the crankshaft 26 shown in FIG. 3. As shown in FIG. 2, the catalytic converter 32 is disposed to the side of the cylinder block 21.

Figure 5:
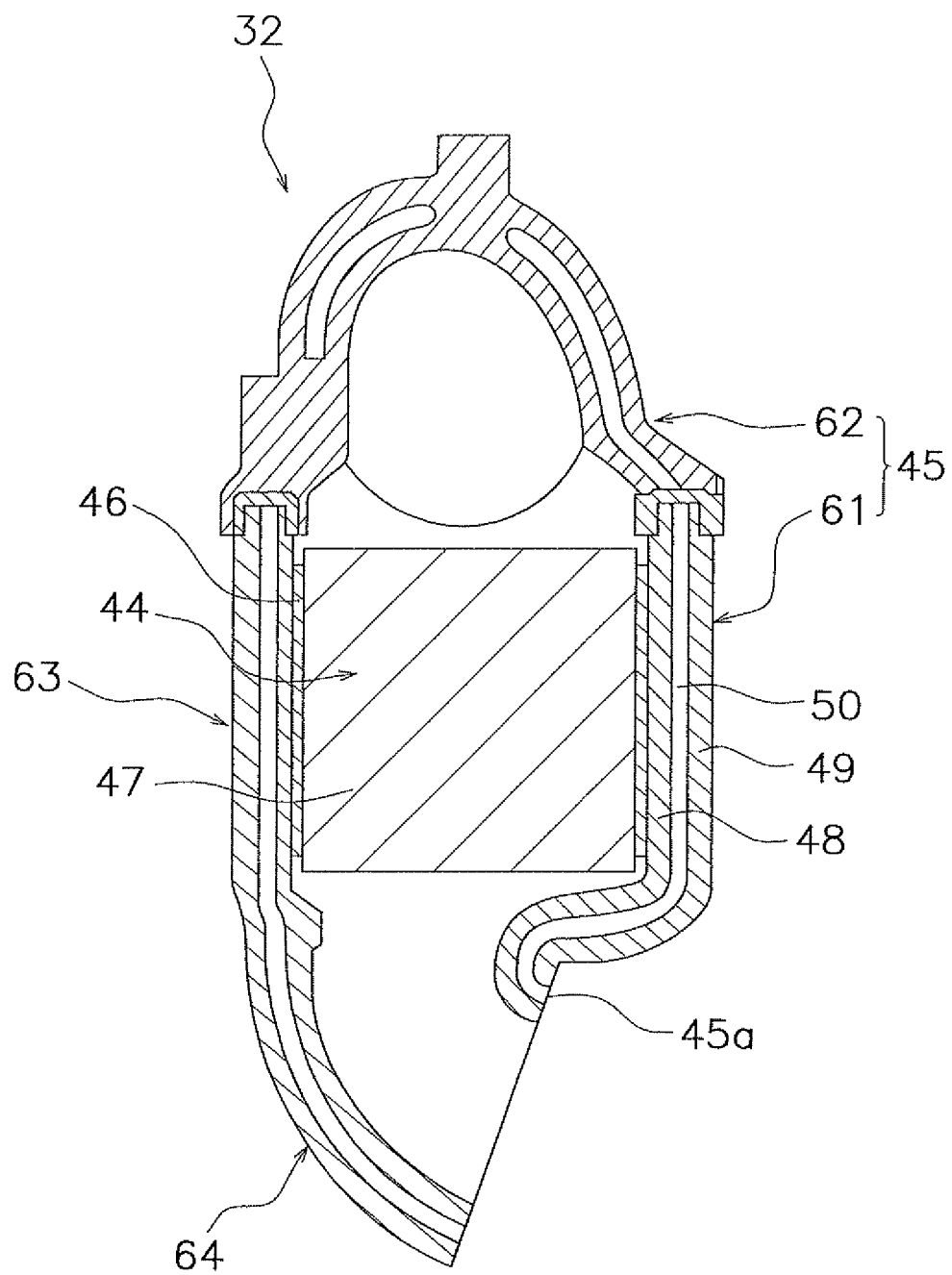
FIG. 5 is an enlarged view of a catalytic converter in FIG. 3.
Figure 6:
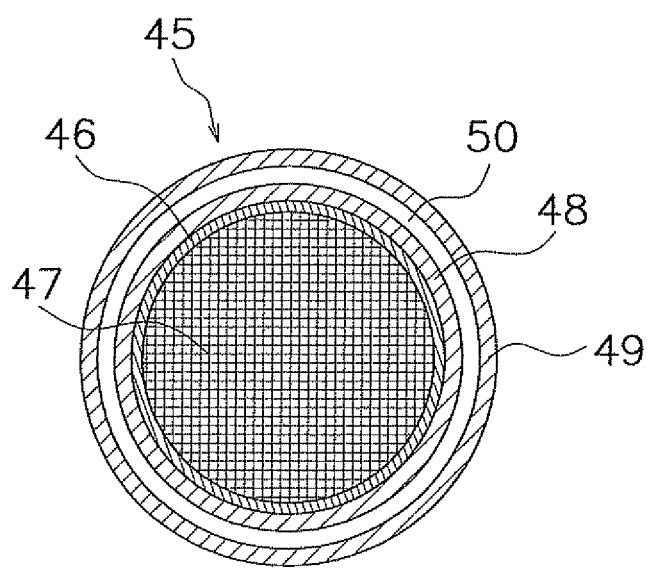
FIG. 6 is a sectional view of a catalytic converter in a cross section along line VI-VI of FIG. 1.

FIG. 5 is an enlarged view of the catalytic converter 32 shown in FIG. 3. The catalytic converter 32 includes the retaining structure for a honeycomb structure according to a preferred embodiment of the present invention. Specifically, as shown in FIG. 5, the catalytic converter 32 includes a catalyst member 44, a retainer mat 46, and a housing 45. The catalyst member 44 is disposed inside the housing 45. The catalyst member 44 includes a honeycomb structure 47 which supports a catalyst for cleaning exhaust gas. A three-way catalyst, for example, is preferably used as the catalyst. FIG. 6 is a sectional view of the catalytic converter 32 in a cross section along line VI-VI of FIG. 1. As shown in FIG. 6, the honeycomb structure 47 preferably includes a cylindrical shaped member made of a ceramic material and having a honeycomb structure. Consequently, the honeycomb structure 47 has a circular cross-sectional shape. The honeycomb structure 47 may have a plurality of holes of a shape not limited to a hexagonal shape, such as a triangular shape, square shape, or other suitable shape. The honeycomb structure 47 is disposed such that exhaust gas flowing through the honeycomb structure 47 flows in the vertical direction. Specifically, the honeycomb structure 47 is disposed such that the axial line of the honeycomb structure 47 extends in the vertical direction. As shown in FIG. 3, the catalyst member 44 is positioned higher than the bottom end portion of the cylinder 21d which is positioned lowermost among the four cylinders 21a to 21d. The retainer mat 46 is wrapped onto the honeycomb structure 47, and contacts the honeycomb structure 47. The retainer mat 46 directly retains the honeycomb structure 47. The retainer mat 46 is a non-expanding mat, and is preferably made, for example, alumina fibers.

Figure 7:
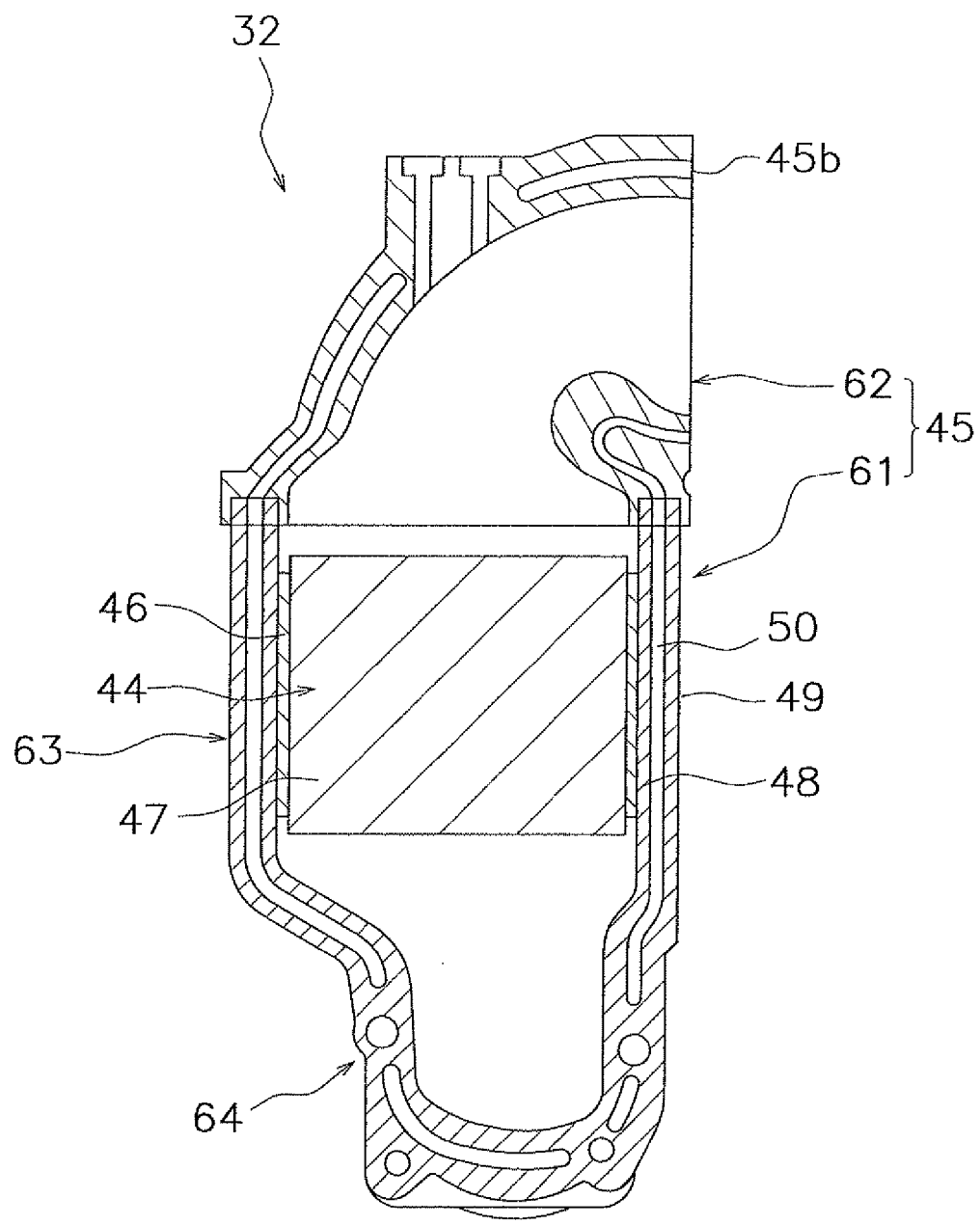
FIG. 7 is a sectional view of a catalytic converter in a plane perpendicular to the lateral direction of the outboard motor.

The housing 45 preferably is a tubular member made of aluminum, and houses the catalyst member 44. The housing 45 contacts the retainer mat 46, and directly retains the retainer mat 46. The housing 45 constitutes a portion of an exhaust passage 16, described below, and exhaust gas passing through the exhaust passage 16 is cleaned in the course of transit through the catalyst member 44 inside the housing 45. The housing 45 includes an inner wall 48, an outer wall 49, and a coolant passage 50. The inner wall 48 contacts the retainer mat 46. The coolant passage 50 is located between the inner wall 48 and the outer wall 49. As shown in FIG. 3, the bottom end of the housing 45 is connected to the first lower opening 54 of the cylinder block 21. Because of this, there is communication between a coolant passage 57 inside the cylinder block 21 and the coolant passage 50 of the housing 45. The coolant flows from the coolant passage 57 inside the cylinder block 21 into the coolant passage 50 of the housing 45. Specifically, as shown in FIG. 5, an inflow port 45a of the coolant passage 50 is located at the bottom end of the housing 45. The top end of the housing 45 connects to the second opening 37 of the exhaust manifold 31. Because of this, there is communication between the coolant passage 50 of the housing 45 and a coolant passage inside the exhaust manifold 31 (not shown). The coolant then flows from the coolant passage 50 inside the housing 45 into the coolant passage inside the exhaust manifold 31. Specifically, as shown in FIG. 7, a discharge port 45b of the coolant passage 50 is located at the top end of the housing 45. FIG. 7 depicts a cross section of the catalytic converter 32 in a plane perpendicular to the lateral direction of the outboard motor 1.

The housing 45 includes a first tube portion 61 and a second tube portion 62. The first tube portion 61 and the second tube portion 62 are separate components. The first tube portion 61 includes a linear portion 63 and a bending portion 64. The linear portion 63 has a linear shape extending in the vertical direction. The linear portion 63 has an outside diameter and an inside diameter greater than those of the bending portion 64. The catalyst member 44 is disposed inside the linear portion 63. The bending portion 64 is positioned below the linear portion 63. The bottom end of the bending portion 64 is connected to the first lower passage 51 shown in FIG. 3. The second tube portion 62 is positioned above the first tube portion 61. One end of the second tube portion 62 is attached to the top end of the first tube portion 61. The other end of the second tube portion 62 is attached to the second opening 37 of the exhaust manifold 31 described above. The second tube portion 62 has a shape that is bent by approximately 90 degrees toward the second opening 37 of the exhaust manifold 31 positioned rearward of the catalytic converter 32. The coolant passage 50 is arranged to extend across the first tube portion 61 and the second tube portion 62. As shown in FIG. 5, the coolant passage 50 is arranged to extend across the entire circumference of the first tube portion 61 in the portion thereof toward the outside periphery of the honeycomb structure 47.

As shown in FIG. 1, the catalytic converter 32 preferably includes a first oxygen sensor 55 and a second oxygen sensor 56 to detect an oxygen concentration in the exhaust gas. The first oxygen sensor 55 is disposed upstream from the catalyst member 44 inside the housing 45. The second oxygen sensor 56 is disposed downstream from the catalyst member 44 inside the housing 45. Detection signals from the first oxygen sensor 55 and the second oxygen sensor 56 are presented to an ECU, not shown. The ECU carries out control of the engine 6 based on detection values of the first oxygen sensor 55 and the second oxygen sensor 56.

As shown in FIG. 1, the outboard motor 1 includes an exhaust passage 16 through which flow exhaust gas expelled from the engine 6. The exhaust passage 16 includes the exhaust manifold 31, the catalytic converter 32, the first lower passage 51 (see FIG. 3), a second lower passage 52, and a third lower passage 53. Exhaust gas expelled from the exhaust ports 25a to 25d is collected in the exhaust manifold 31 and flows to the catalytic converter 32. After being cleaned in the catalytic converter 32, the exhaust gas flows into the first lower passage 51. As shown in FIG. 3, the first lower passage 51 is located inside the cylinder block 21. The first lower passage 51 includes the first lower opening 54. The first lower opening 54 is located in a side surface of the bottom portion of the cylinder block 21. The first lower passage 51 is connected to the catalytic converter 32 via the first lower opening 54. As shown in FIG. 1, the second lower passage 52 is located inside the exhaust guide portion 4. The second lower passage 52 is connected to the first lower passage 51. The third lower passage 53 is located inside the lower casing 3. The third lower passage 53 is connected to the second lower passage 52. The third lower passage 53 is also connected to the propeller boss 13. Exhaust gas flows from the first lower passage 51 through the second lower passage 52, the third lower passage 53, and the inside of the propeller boss 13, and is expelled to the outside.

The members that constitute the exhaust passage 16 are made of aluminum. Specifically, each of the cylinder head 22, the exhaust manifold 31, the housing 45 of the catalytic converter 32, the cylinder block 21 constituting the first lower passage 51, the exhaust guide portion 4 constituting the second lower passage 52, and the third lower passage 53 inside the lower casing 3 is preferably made of aluminum.

In the outboard motor 1 according to the present preferred embodiment, the honeycomb structure 47 is made of a ceramic material, and therefore can be lighter in weight as compared with a component made of metal such as stainless steel. Also, the housing 45 directly retains the honeycomb structure 47 which is wrapped in the retainer mat 46. Because of this, further reduction in weight is possible, as compared with the case where the honeycomb structure 47 wrapped in the retainer mat 46 is retained by the housing 45 via an additional member. Moreover, because the housing 45 is made of aluminum and stainless steel is not used, weight can be reduced even further.

In a case where the honeycomb structure 47 wrapped in the retainer mat 46 is directly retained by the housing 45, the housing 45 is susceptible to being affected by heat from the honeycomb structure 47. Also, the melting point of aluminum is lower than the melting point of stainless steel. Consequently, in the housing 45 made of aluminum, there is a susceptibility to erosion occurring at locations receiving heat from the honeycomb structure 47. However, in the catalytic converter 32 according to the present preferred embodiment, the coolant passage 50 is arranged to extend across the housing 45 from one end to the other end thereof. Because of this, erosion of the housing 45 can be prevented. Also, thermal effects on components surrounding the catalytic converter 32 can be minimized.

The honeycomb structure 47 has a circular cross-sectional shape. Because of this, the honeycomb structure 47 can be readily inserted inside the housing 45 through pressure insertion.

The honeycomb structure 47 is retained directly by the housing 45 and the retainer mat 46, without the use of a retaining bracket. Because of this, the outside diameter of the housing 45 can be smaller. As a result, as shown in FIG. 2, the catalytic converter 32 can be disposed in compact fashion to the side of the cylinder block 21. So doing allows the catalytic converter 32 to be disposed in compact fashion in the limited space available inside the upper casing 2 of the outboard motor 1.

The members constituting the exhaust passage 16 are preferably made of aluminum. Specifically, the members which are connected to the aluminum housing 45 are also made of aluminum. Because of this, corrosion of stainless steel components due to electrochemical corrosion, such as that arising in cases where the housing 45 made of aluminum is connected to stainless steel components, does not occur. In so doing, the durability of the members constituting the exhaust passage 16 can be improved.

While a preferred embodiment of the present invention was described hereinabove, the present invention is not limited to the preferred embodiment described above; various modifications are possible without departing from the spirit of the invention. For example, the present invention is not limited to an outboard motor as in the preferred embodiment described above, and may be implemented in other marine propulsion devices such as personal watercraft (PWC). The exhaust manifold may be formed as a body separate from the cylinder head. The number of pistons of the engine is not limited to four; three or fewer, or five or more may also be used. The disposition of the pistons is not limited to an in-line disposition; e.g., a V-type disposition is also acceptable. A honeycomb structure that does not support a catalyst may be disposed in the exhaust passage, rather than the honeycomb structure 47 that supports a catalyst, as with the catalyst member 44 of the preferred embodiment described above. In the preferred embodiment described above, the honeycomb structure 47 preferably is disposed with the axial line extending in the vertical direction, but the honeycomb structure may instead be disposed with the axial line inclined with respect to the vertical direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A retaining structure for a honeycomb structure, comprising:
    a honeycomb structure made of a ceramic material;
    a retainer mat directly retaining and contacting the honeycomb structure; and
    a housing made of aluminum, the housing directly retaining and contacting the retainer mat; wherein
    the housing includes:
        an inner wall contacting the retainer mat;
        an outer wall; and
        a coolant passage located between the inner wall and the outer wall, an inflow port of the coolant passage being located at a first end of the housing, and a discharge port of the coolant passage being located at a second end of the housing.

2. The retaining structure for a honeycomb structure according to claim 1, wherein the honeycomb structure has a circular cross-sectional shape.

3. The retaining structure for a honeycomb structure according to claim 1, wherein the honeycomb structure includes a catalyst support supporting a catalyst.

4. A marine propulsion device comprising:
    an engine; and
    a retaining structure for a honeycomb structure including:
        a honeycomb structure made of a ceramic material;
        a retainer mat directly retaining and contacting the honeycomb structure; and
        a housing made of aluminum, the housing directly retaining and contacting the retainer mat; wherein
        the housing includes:
            an inner wall contacting the retainer mat;
            an outer wall; and
            a coolant passage located between the inner wall and the outer wall, an inflow port of the coolant passage being located at a first end of the housing, and a discharge port of the coolant passage being located at a second end of the housing.

5. The marine propulsion device according to claim 4, wherein the honeycomb structure is arranged such that exhaust gas flowing through the honeycomb structure flows in a vertical direction.

6. The marine propulsion device according to claim 4, further comprising:
    an upper casing containing the engine; and
    a lower casing positioned below the upper casing; wherein the honeycomb structure is disposed inside the upper casing.

7. The marine propulsion device according to claim 4, wherein a member constituting an exhaust passage and connected to the housing is made of aluminum.

* * * * *